(12) United States Patent  (10) Patent No.: US 8,506,473 B2
Puria  (45) Date of Patent: Aug. 13, 2013

(54) HEARING-AID TRANSDUCER HAVING AN ENGINEERED SURFACE

(75) Inventor: Sunil Puria, Sunnyvale, CA (US)

(73) Assignee: SoundBeam LLC, Redwood City, CA (US)

( * ) Notice: Subject to any disclaimer, the term of this patent is extended or adjusted under 35 U.S.C. 154(b) by 756 days.

(21) Appl. No.: 12/633,614

(22) Filed: Dec. 8, 2009

(65) Prior Publication Data

US 2010/0152527 A1    Jun. 17, 2010

Related U.S. Application Data

(60) Provisional application No. 61/122,962, filed on Dec. 16, 2008.

(51) Int. Cl.
*H04R 25/00* (2006.01)
*H04R 25/02* (2006.01)

(52) U.S. Cl.
USPC .......................................................... 600/25

(58) Field of Classification Search
USPC .................. 600/25; 181/126–137; 381/23.1, 381/312–331
See application file for complete search history.

(56) References Cited

U.S. PATENT DOCUMENTS

| 4,800,884 | A |   | 1/1989  | Heide et al. |
| 5,259,032 | A | * | 11/1993 | Perkins et al. ............... 381/312 |
| 5,277,694 | A |   | 1/1994  | Leysieffer |
| 5,797,834 | A |   | 8/1998  | Goode |
| 6,068,589 | A | * | 5/2000  | Neukermans .................. 600/25 |
| 2003/0208888 | A1 | * | 11/2003 | Fearing et al. .................. 24/442 |
| 2005/0038498 | A1 | * | 2/2005  | Dubrow et al. ............. 623/1.15 |
| 2005/0271870 | A1 | * | 12/2005 | Jackson ..................... 428/297.7 |
| 2006/0237126 | A1 |   | 10/2006 | Guffrey |
| 2007/0100197 | A1 |   | 5/2007  | Perkins |
| 2010/0036488 | A1 |   | 2/2010  | De Juan, Jr. et al. |
| 2011/0077453 | A1 | * | 3/2011  | Pluvinage et al. ............. 600/25 |

FOREIGN PATENT DOCUMENTS

| DE | 3508830 A1 | 9/1986 |
| WO | WO 2009/145842 A2 | 12/2009 |
| WO | WO 2009/146151 A2 | 12/2009 |

OTHER PUBLICATIONS

Murphy M, Aksak B, Sitti M. Adhesion and anisotropic friction enhancements of angled heterogeneous micro-fiber arrays with spherical and spatula tips. J Adhesion Sci Technol, vol. 21, No. 12-13, p. 1281-1296, 2007.*
PCT/US2009/067703 International Preliminary Report on Patentability (Jun. 21, 2011).
PCT/US2009/067703 International Search Report and Written Opinion of the International Searching Authority (Jul. 21, 2010).
R. Spolenak et al., Effects of contact shape on the scaling of biological attachments, Proc. R. Soc. A (2005) 461, 305-319.
K. Makino et al., Epithelial migration in the healing process of tympanic membrane perforations, Eur Arch Otorhinolaryngol (1990) 247: 352-355.

(Continued)

*Primary Examiner* — Charles A Marmor, II
*Assistant Examiner* — Catherine E Burk
(74) *Attorney, Agent, or Firm* — Wilson Sonsini Goodrich & Rosati

(57) ABSTRACT

A hearing aid transducer adapts itself to variations in the surface of a tympanic membrane and slides over the migrating membrane without lubrication. Microscopic setae create a conforming interface between the biocompatible material of the transducer and the living tissue of the tympanic membrane.

20 Claims, 11 Drawing Sheets

(56) References Cited

OTHER PUBLICATIONS

H. Yao et al., Maximum strength for intermolecular adhesion of nanospheres at an optimal size, J. R. Soc. Interface doi:10.1098/rsif.2008.0066 Published online 2008.

J. Fay et al., The discordant eardrum, PNAS, Dec. 26, 2006, vol. 103, No. 52, p. 19743-19748.

K. Autumn et al., Dynamics of geckos running vertically, The Journal of Experimental Biology 209, 260-272, (2006).

D. Boedts, Tympanic epithelial migration, Clinical Otolaryngology 1978, 3, 249-253.

L. Michaels et al., Auditory Epithelial Migration on the Human Tympanic Membrane: II. The Existence of Two Discrete Migratory Pathways and Their Embryologic Correlates, The American Journal of Anatomy 189:189-200 (1990).

L. Ge et al., Carbon nanotube-based synthetic gecko tapes, p. 10792-10795, PNAS, Jun. 26, 2007, vol. 104, No. 26.

K. Autumn et al., Evidence for van der Waals adhesion in gecko setae, www.pnas.orgycgiydoiy10.1073ypnas.192252799 (2002).

S. Puria et al., Mechano-Acoustical Transformations in A. Basbaum et al., eds., The Senses: A Comprehensive Reference, v3, p. 165-202, Academic Press (2008).

K. Makino et al., Epithelial migration on the tympanic membrane and external canal, Arch Otorhinolaryngol (1986) 243: 39-42.

H. Yao et al., Adhesion and sliding response of a biologically inspired fibrillar surface: experimental observations, J. R. Soc. Interface (2008)5, 723-733 doi:10.1098/rsif.2007.1225 Published online Oct. 30, 2007.

S. Gorb et al., Structural Design and Biomechanics of Friction-Based Releasable Attachment Devices in Insects, Integr. Comp. Biol., 42:1127-1139 (2002).

A. Asbeck et al., Scaling Hard Vertical Surfaces with Compliant Microspine Arrays, The International Journal of Robotics Research 2006; 25; 1165.

L. Qu et al., Carbon Nanotube Arrays with Strong Shear Binding-On and Easy Normal Lifting-Off, Oct. 10, 2008 vol. 322 Science, p. 238-242.

\* cited by examiner

HEARING-AID TRANSDUCER HAVING AN ENGINEERED SURFACE

RELATED APPLICATIONS

This application claims priority benefit of U.S. provisional patent application No. 61/122,962, filed on Dec. 16, 2008, and incorporated herein by reference.

GOVERNMENT RIGHTS

Inventions disclosed herein were made with U.S. Government support under contract R44 DC008499 awarded by NIDCD of the NIH. The Government has certain rights in the inventions.

TECHNICAL FIELD

The disclosure is related to interfaces between biocompatible materials and living tissues, especially as applied to hearing aid transducers and contact lenses.

BACKGROUND

An "EarLens™" is a contact transducer assembly for a hearing aid. Examples of EarLenses are described by Perkins and Shennib in U.S. Pat. No. 5,259,032 ("Perkins"), incorporated herein by reference. An EarLens is a biocompatible, removable contact transducer that is supported on the tympanic membrane of a wearer without the use of adhesives or mechanical attachments. The name "EarLens" was chosen because the installation and removal of the contact transducer assembly is reminiscent of the method for insertion and removal of contact lenses for the eyes. Furthermore, surface wetting agents may be used with the EarLens in analogy to the use of wetting solutions for contact lenses for the eyes.

Hearing aids based on EarLenses or other contact transducers offer potential advantages over conventional systems. A conventional hearing aid uses an acoustic transducer to generate amplified sound waves in air that are received by the tympanic membrane (eardrum) of a wearer. In contrast, a contact transducer is one that imparts vibrations directly to the tympanic membrane. Simply put, a contact transducer touches the eardrum while an acoustic transducer is a very small loudspeaker that is located near, but not touching, the eardrum. (FIG. 1 is a diagram of the human auditory system including the ear canal, tympanic membrane, ossicles, and the cochlea.)

Vibrations of the tympanic membrane are perceived as sound regardless of whether the vibrations are stimulated by sound waves in air or by a contact transducer. Contact transducers offer better sound quality than acoustic transducers and they reduce feedback problems. However, the development of hearing aids using contact transducers has taken many years. The Perkins EarLens eliminates problems associated with adhesives that were previously used to attach transducers to the eardrum and it does not require surgery.

Currently EarLens contact transducers are custom fitted for each wearer by making a negative impression of the wearer's eardrum. A positive mold is then created and a biocompatible material is cast or molded from the positive impression. EarLenses also use a surface wetting agent to enhance sufficient, but weak, adhesion to the tympanic membrane while allowing the tympanic membrane epithelium below to naturally migrate. Mineral oil is often used as a surface wetting agent and may be periodically sprayed into the ear canal after placement of an EarLens device.

BRIEF DESCRIPTION OF THE DRAWINGS

The drawings are heuristic for clarity.

DETAILED DESCRIPTION

An advanced hearing aid transducer having a patterned surface is now described. The transducer is an improved EarLens distinguished by micro- and/or nano-structures patterned on the EarLens' surface. These structures allow the EarLens to adapt to the unique surface variations of a person's eardrum or ear canal and also permit the lens to remain in position despite eardrum tissue migration. Micro- or nano-structured surfaces are also applicable in other applications where artificial devices interact with living tissues such as the interaction between a contact (optical) lens and a cornea.

Human eardrums exist in a wide variety of shapes and sizes. Although it may be possible to form a set of base shapes that will approximately fit most tympanic membranes, such a set has not yet been demonstrated. Furthermore, no suitable malleable material has been found that conforms to a person's eardrum on contact. Therefore, the current state of the art requires a custom mold for each ear to be fitted with an EarLens. As described in detail below, an advanced hearing aid transducer with a patterned surface solves this problem through the use of thousands of tiny setae, or hair-like structures, which bend to conform to the unique topography of a person's eardrum.

Movement of tissue forming the tympanic membrane complicates attempts to install contact transducers on it. Epithelial migration refers to the generation of new tissue near the center of the tympanic membrane and around the malleus, and the movement of tissue toward the edge of the membrane over a period of weeks. Migration of eardrum tissue is an important self-cleaning mechanism which carries keratin outward for removal. Although the factors which control the speed and direction of migration are somewhat obscure, migration patterns are well characterized.

Figure 1:
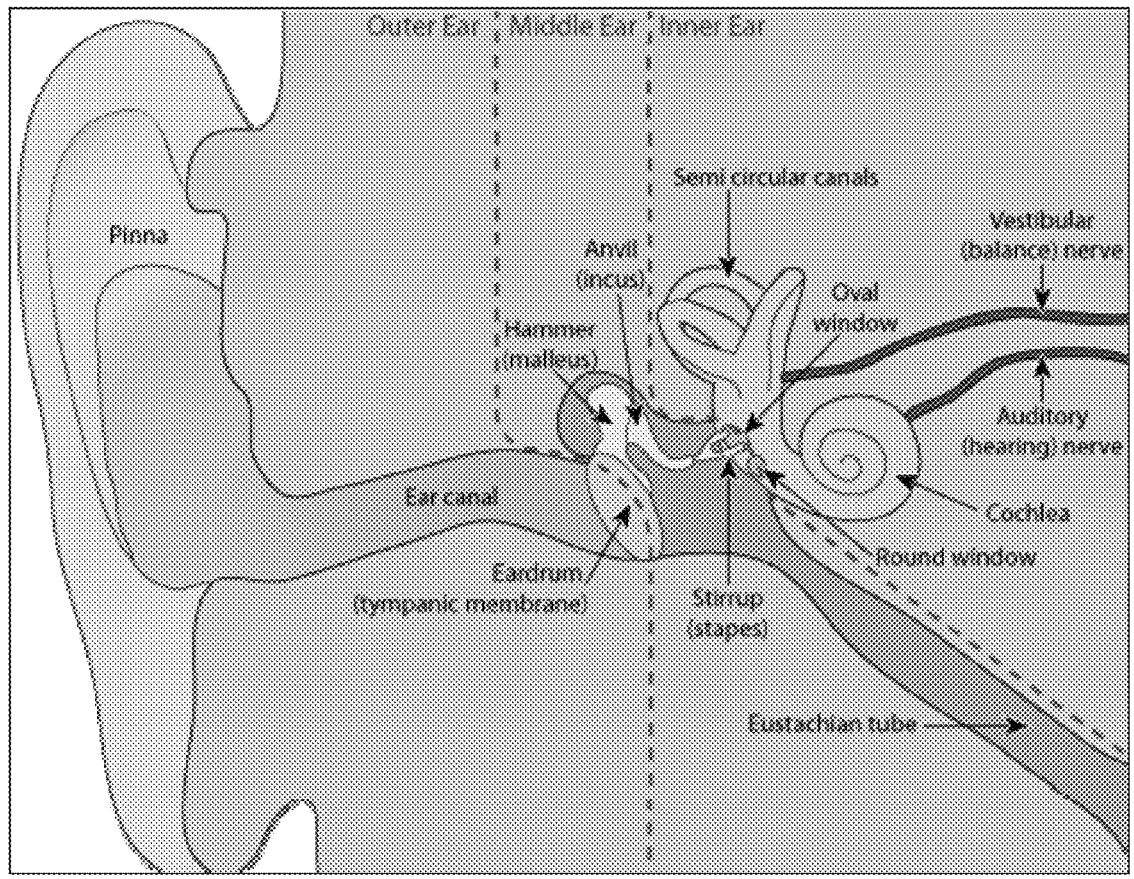
FIG. 1 is a diagram of the human auditory system including the ear canal, tympanic membrane, ossicles, and the cochlea.
Figure 2:
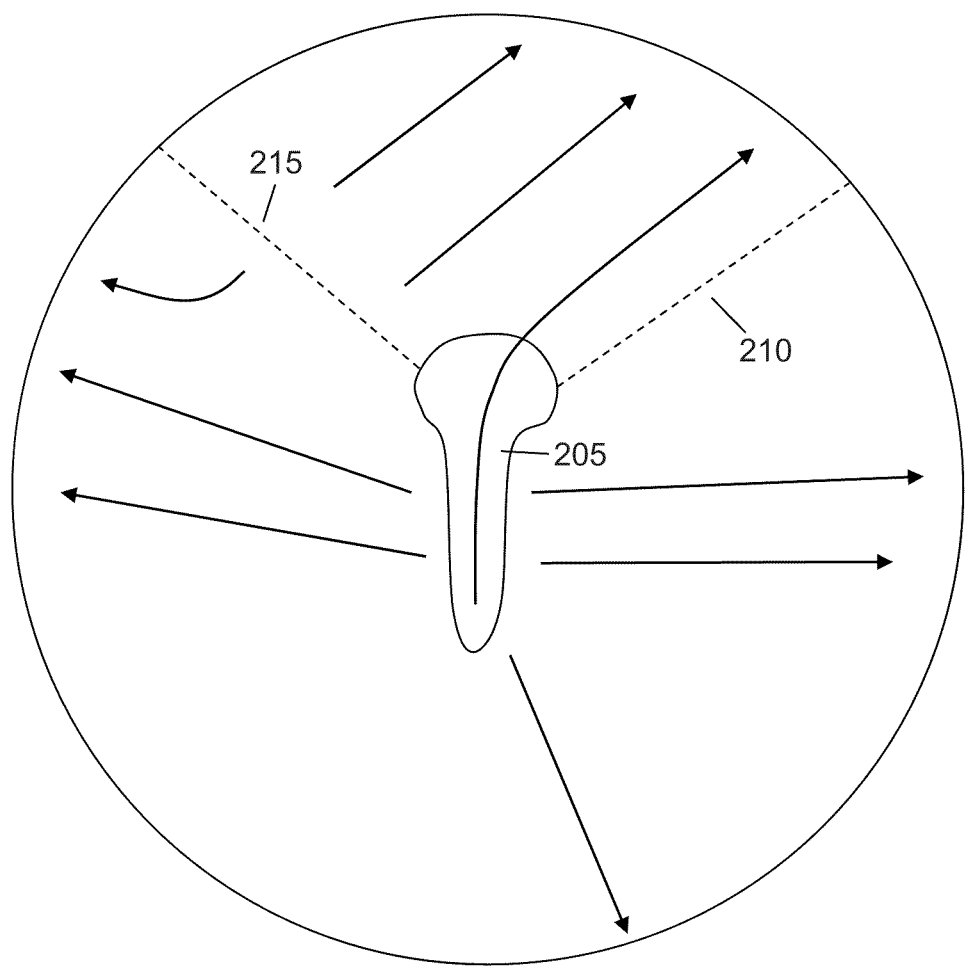
FIG. 2 is a diagram showing typical migration patterns of a tympanic membrane epithelium.

FIG. 2 is a diagram showing typical migration patterns of a tympanic membrane epithelium. (The en face view in FIG. 2 is based on a report by L. Michaels, Am. J. Anat. 189:189-200 (1990).) New tissue is created in a central region 205 of the membrane and along radial regions 215 and 210 located roughly at 10 and 2 o'clock as represented by dashed lines in the figure. Current EarLenses overcome migration through the use of a surface wetting and lubrication layer which is often mineral oil. As described in detail below, an advanced hearing aid transducer with a patterned surface eliminates the need for periodic oiling through the use of thousands of tiny setae, or hair-like structures which cling to the eardrum, yet allow it to slide past them during migration.

Figure 3:
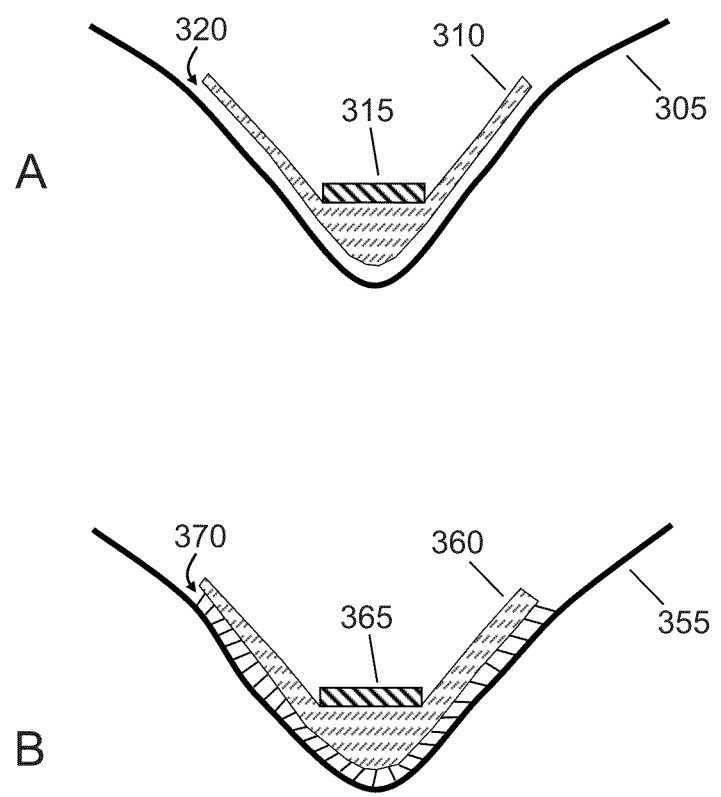
FIGS. 3A and 3B show cross sectional views of conventional (A) and advanced (B) EarLens transducers having an engineered surface.

FIGS. 3A and 3B show cross sectional views of conventional (A) and advanced (B) EarLens transducers having an engineered surface. In FIG. 3A solid line 305 represents a cross section of a tympanic membrane or eardrum. EarLens 310 is a roughly cone-shaped structure that supports transducer element 315. Transducer element 315 converts an electrical signal into vibrations that are imparted to eardrum 305 via EarLens 310. In typical use, a thin layer of surface wetting agent or lubricant (e.g. mineral oil) fills the space 320 between the EarLens 310 and the tympanic membrane 305. FIG. 3B is similar to 3A with the addition of patterned setae on the convex surface of EarLens 360. Solid line 355 represents a cross section of a tympanic membrane and EarLens 360 supports transducer element 365.

Thousands of microscopic setae 370 fill the thin space between EarLens 360 and eardrum 355. The representation of setae 370 is schematic only, not to scale. An EarLens, as shown in FIGS. 3A and 3B, fits in the umbo area of the eardrum. The lens is roughly 1 mm thick and made from an elastomeric material such as silicone. In an actual application there are between about 100 and 100,000 setae per square millimeter of the EarLens convex surface and individual setae are between a few microns to several hundred microns long. The aspect ratio (i.e. length divided by diameter) of a seta is between about 10 and about 1000. Note that the setae are angled away from the malleus region.

Figure 4:
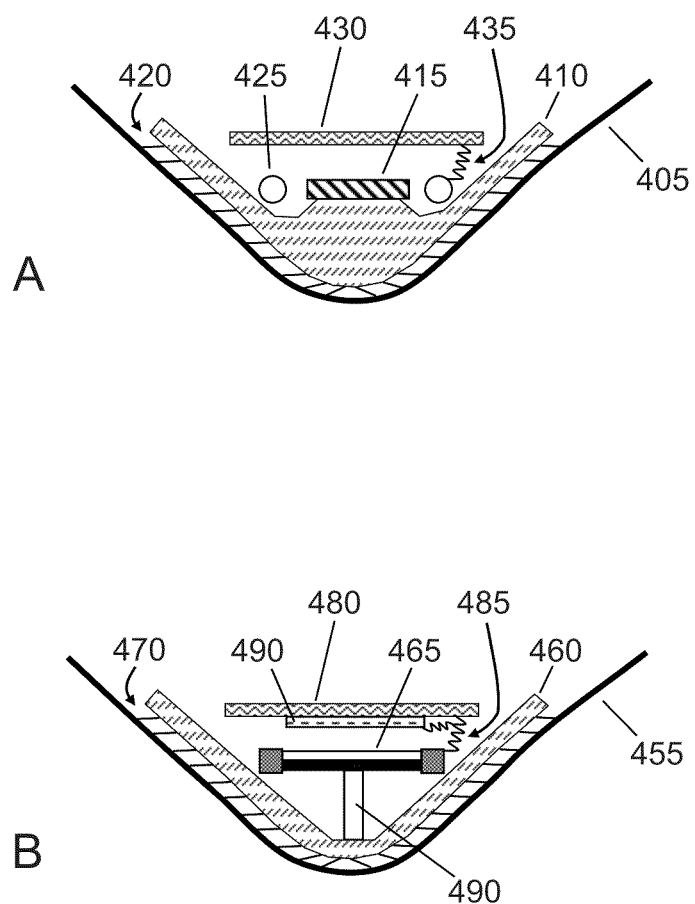
FIGS. 4A and 4B show cross sectional views of advanced EarLenses using photovoltaic cells as power and signal receivers, and coil-and-magnet (A) and piezoelectric (B) sound transducers.

FIGS. 4A and 4B show cross sectional views of advanced EarLenses using photovoltaic cells as power and signal receivers, and coil-and-magnet (A) and piezoelectric (B) sound transducers. In FIG. 4A solid line 405 represents a cross section of a tympanic membrane. EarLens 410 is a roughly cone-shaped structure that supports transducer magnet 415. A plurality of magnets 415 are driven by a plurality of coils 425 which are connected to a plurality of photovoltaic cells 430 via small wires 435. Thousands of microscopic setae 420 fill the thin space between EarLens 410 and eardrum 405. Electrical signals and power may be delivered to photovoltaic cell 430 via light beams generated by diode lasers or other suitable light sources. For example, a diode laser may be packaged with a microphone, digital signal processor, and amplifier in the ear canal or behind the ear. Coil 425 and magnet 415 transform electrical signals into vibrations of the EarLens which are transmitted to the tympanic membrane 405 as sounds.

In FIG. 4B solid line 455 represents a cross section of a tympanic membrane. EarLens 460 supports post 490 which is connected to piezoelectric elements 465. Piezoelectric elements 465 are connected to photovoltaic cells 480 via small wire bundles 485. The photovoltaic cells also supply power through the wire bundles to electronic circuit 490 and the circuit is similarly connected to the piezoelectric elements. Thousands of microscopic setae 470 fill the thin space between EarLens 460 and eardrum 455. Electrical signals and power may be delivered to photovoltaic cell 480 via a light beam generated by diode lasers or other suitable light sources. In the design of FIG. 4B, electronic circuit 490 may be used for signal processing, amplification, filtering or other tasks. Piezoelectric elements 465 vibrate in response to electrical signals delivered to it and the vibrations are carried through support post 490 to EarLens 460 and finally to tympanic membrane 405. Further details of the optical transmission architecture and electronics are described in co-pending U.S. provisional patent applications 61/073,271 and 61/073,281 both filed on Jun. 17, 2008 and incorporated herein by reference in their entirety.

Figure 5:
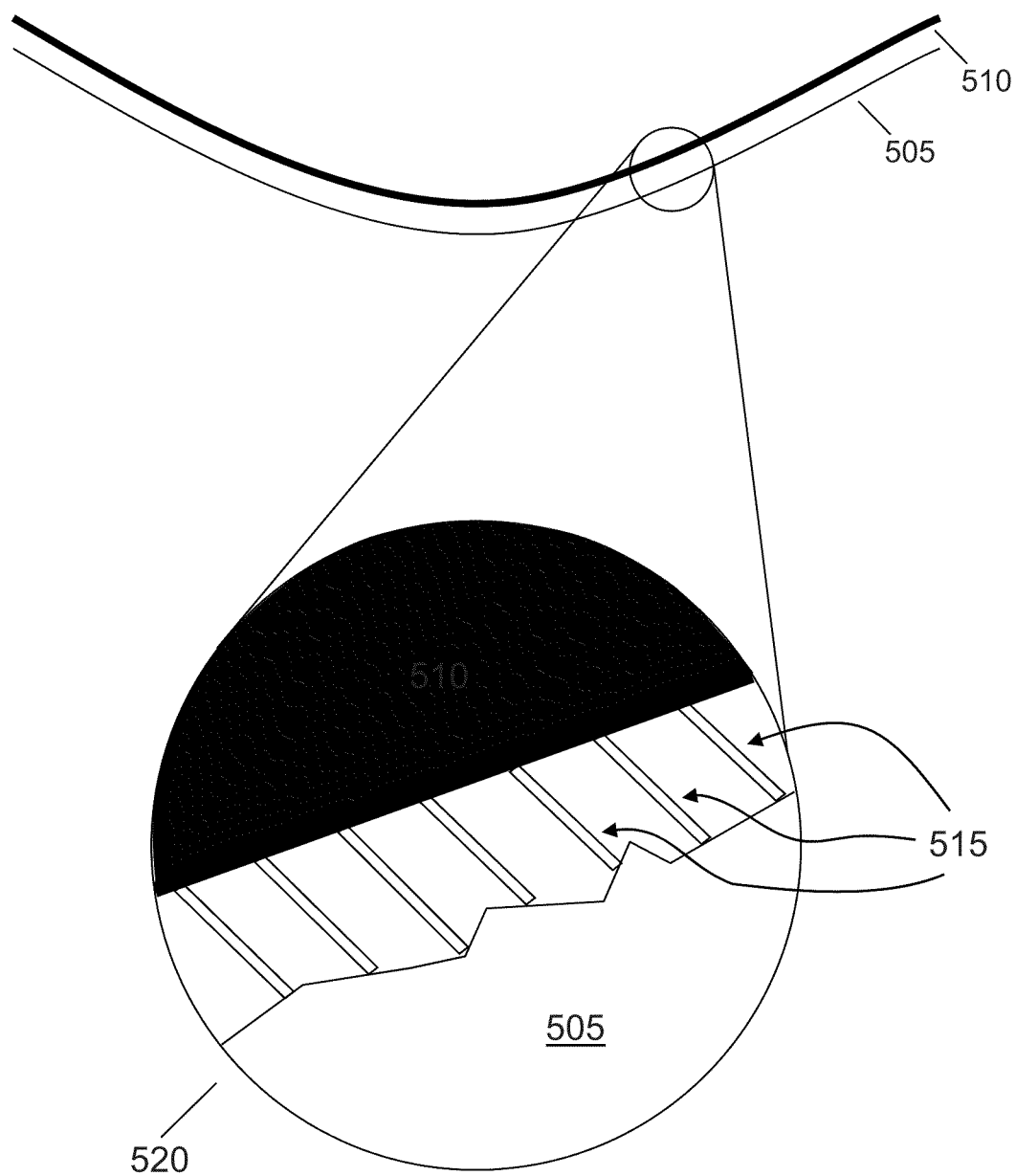
FIG. 5 shows an advanced EarLens fitting on the surface of an ear drum.

FIG. 5 shows an advanced EarLens 510 fitting on the surface of an eardrum 505. In FIG. 5, only the surfaces of the EarLens and ear drum are illustrated and these surfaces are shown in cross section. Only the umbo region of the tympanic membrane, where an EarLens is placed, is shown. (EarLenses normally do not cover the entire membrane; however, they may extend to regions other than the umbo area including the ear canal.) Inset 520 shows a magnified view of the thin region between EarLens 510 and eardrum 505. In this view the magnification is such that some of the thousands of tiny setae 515 on the surface of the EarLens are visible. The setae form a flexible, conforming interface between the two surfaces without the need for liquid lubricants. Eardrum 505 has contours, roughness and irregularities that are unique to each individual. The setae accommodate these variations so that one EarLens design is suitable for many different ear drum surfaces without the need for customization.

Figure 6:
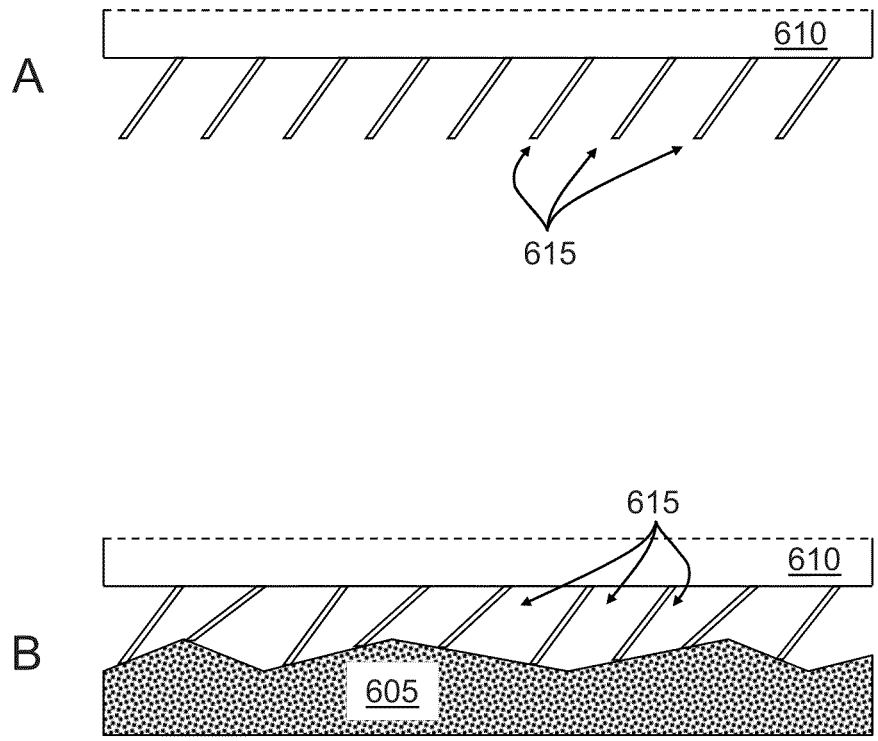
FIGS. 6A and 6B show part of a biocompatible surface comprising setae and a living tissue surface.

Further detail of setae are illustrated in FIGS. 6A and 6B which show part of a biocompatible surface comprising setae and a living tissue surface. In FIGS. 6A and 6B biocompatible surface 610 has a plurality of tiny setae 615 attached to it. The setae may be fabricated at the same time as surface 610 or connected to the surface later. In FIGS. 6A and 6B the setae are illustrated as being spaced apart by roughly the same distance as the length of an individual setae; however, the spacing may range from much more to much less than this distance. For example, closely spaced setae may be used when improved adhesion between biocompatible surface 610 and another surface is needed. Conversely, sparsely spaced setae may be used if accumulation of debris between setae is a concern. For example, if contamination from biological cells is a concern, spacing between setae much smaller or much greater than the characteristic cell size (often about 8 μm for blood cells or 30 μm for skin cells, as examples) may be used. When setae are spaced by approximately a cell size, they may become clogged with stray cells. FIG. 6B shows biocompatible surface 610 in contact (via its setae) with a living tissue surface 605. Examples of tissue surfaces include a tympanic membrane epithelial surface, the cornea, skin, membranes of the mouth and throat, or other biological membranes.

In FIG. 6B, surface 605 has some roughness and irregularities; it is not perfectly flat. Setae 615 bend to follow the topography of surface 605. In FIGS. 6A and 6B the aspect ratio, or ratio of lengths to diameter, of each seta is shown as roughly 10, meaning a seta is ten times longer than it its diameter. However, setae may have aspect ratios ranging from roughly 3 to roughly 100 and setae of differing aspect ratios may be mixed on a single surface. It is necessary, however, that the setae be flexible enough to follow the undulations of the surface with which they come in contact. The Young's modulus of the setae material may be between about 0.01 GPa and 10 GPa. The setae in FIGS. 6A and 6B are illustrated as all having the same length, although this is not a requirement. Setae bend more when surfaces 610 and 605 are close together and less when the surfaces are more distant from one another.

Figure 7:
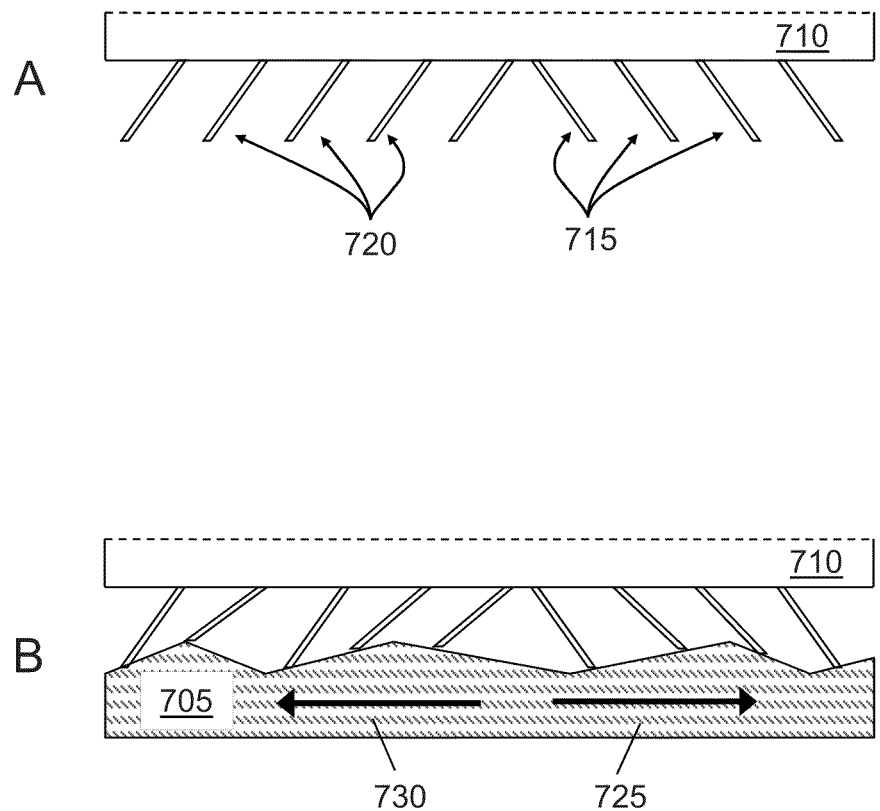
FIGS. 7A and 7B show a cross section of part of an advanced EarLens surface comprising setae oriented for migration of a tympanic membrane.

FIGS. 7A and 7B show a cross section of part of an advanced EarLens surface comprising setae oriented for migration of a tympanic membrane. In FIGS. 7A and 7B EarLens surface 710 has a plurality of setae affixed to it.

Reference numerals 715 and 720 point out two groups of such setae oriented in different directions. In particular setae 715 angle from the surface toward the right side of the figure while setae 720 are angled the opposite direction. FIG. 7B shows the EarLens surface comprising setae in contact with a tympanic membrane 705.

The part of tympanic membrane 705 shown in FIG. 7B is one in which new tissue is being generated. Arrows 725 and 730 indicate the direction of migration of the new tissue away from its source. EarLens 710 is designed so that the orientation of its setae match the migration of tissue in a tympanic membrane as described in FIG. 2. The setae are angled away from a normal to the EarLens surface in the direction of tissue migration. This design allows the eardrum tissue to migrate while the EarLens remains in contact with the tympanic membrane and centered around the malleus region or the umbo region.

Figure 8A:
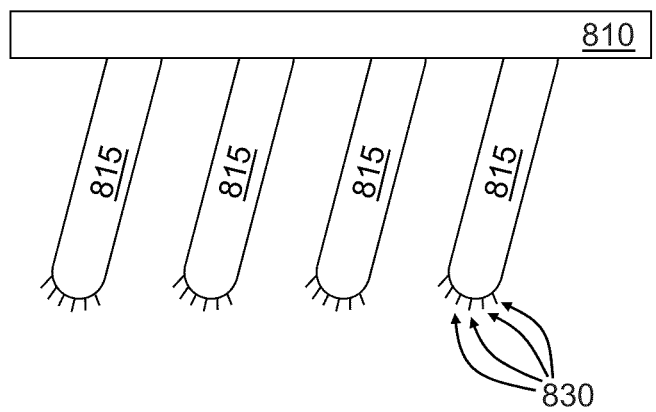
FIGS. 8A-8G show setae comprising fine structure at their tips.
Figure 8B:
Figure 8C:
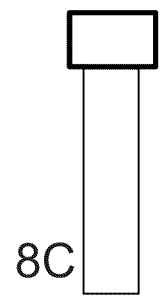
Figure 8D:
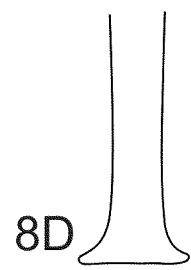
Figure 8E:
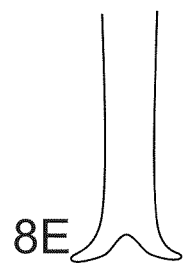
Figure 8F:
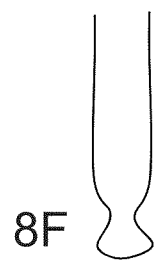
Figure 8G:

Setae may be designed with additional features. FIG. 8A, for example, shows setae comprising fine structure at their tips. In FIG. 8A, surface 810 supports a plurality of setae 815. Setae 815 in turn support even finer structures 830 called spatula at their tips. FIGS. 8B-8G show various setae tip shapes. Setae tips may have spherical (B), flat (C, D), cupped (E), foot (F), or filament (G) shapes as examples. The shape of a seta tip influences how much force the seta exerts on a surface under different load strength and load angle conditions. Flatter tips provide more tip-surface interaction area for example.

Figure 9:
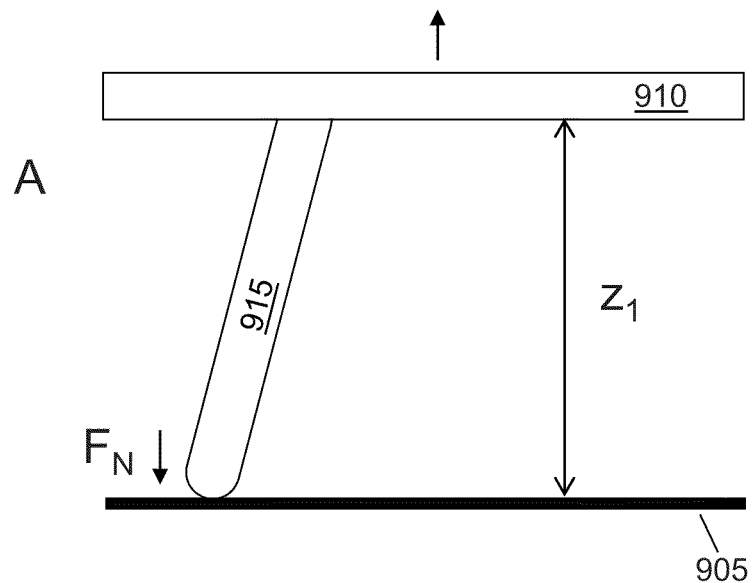
FIGS. 9A and 9B show a seta in contact with a surface under normal and parallel force conditions.
Figure 9:
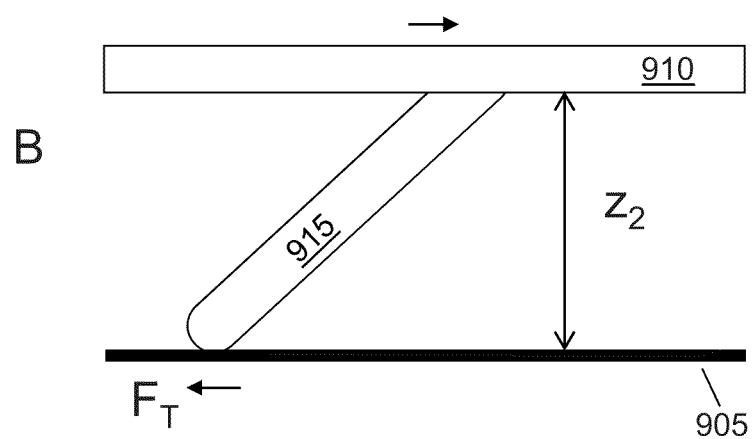

FIGS. 9A and 9B show a single seta in contact with a surface under normal and parallel force conditions. FIG. 9A shows a structure 910 (such as an EarLens, for example) with seta 915 in contact with a surface 905 (such as an eardrum, for example). The distance between the structure and the surface is denoted $z_1$. In FIG. 9A a force $F_N$, normal to surface 905 has been applied to structure 910. FIG. 9B shows the same structure, seta, and surface as shown in FIG. 9A. In FIG. 9B, however, a force $F_T$, tangential to surface 905 has been applied to structure 910 and the distance between the structure and the surface is denoted $z_2$. Vertical force $F_N$ exerted by a transducer sitting on structure 910 is transmitted to surface 905. This allows the transducer to transmit sound and/or vibrations to an eardrum.

When setae rest on a surface they grip the surface through small electrostatic and Van der Waals forces. The sum of such forces contributed by thousands or millions of setae can be significant. When a structure with setae is slid past a surface by a parallel force as illustrated in FIG. 9B, however, the tensile strength of a seta is greater that the force between it and the surface and the seta slides over the surface. Structures featuring setae are therefore suited to holding an EarLens on the surface of a migrating tympanic membrane. This same effect allows an optical contact lens having an engineered surface to rest on the surface of a cornea without needing conventional contact lens lubricating fluids.

Figure 10:
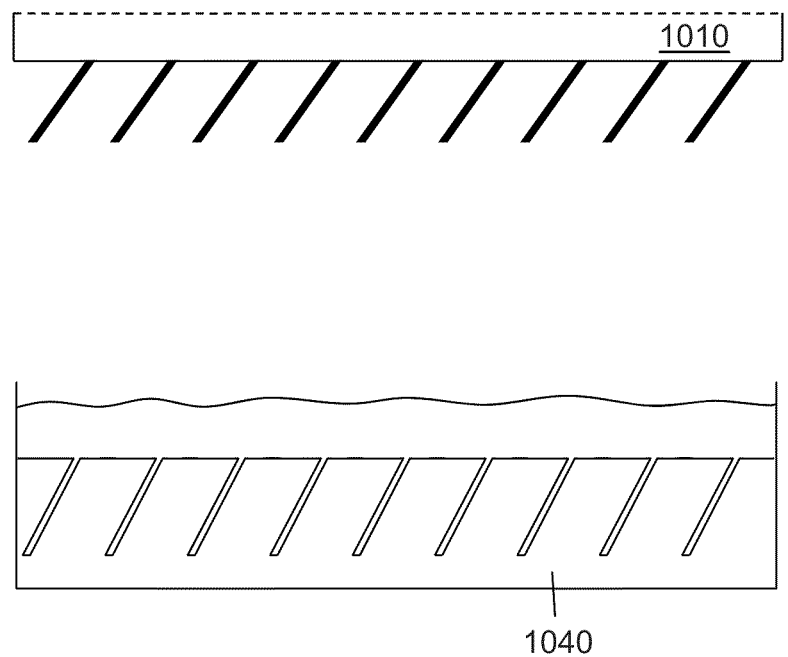
FIG. 10 shows a surface having setae and a mold for making same.

FIG. 10 shows a surface 1010 having setae and a mold 1040 for making same. Mold 1040 may be filled with a liquid elastomer that is cured and then released forming surface 1010. Methods for releasing a cured setae surface from a mold include changing the temperature of the mold, using coatings or sacrificial layers to coat the mold before filling it with liquid elastomer, using an elastomer that elutes a lubricant, such as oil, upon curing, and using an elastomer that shrinks upon curing. An additional method for manufacturing the engineered surface uses carbon nanotube fabrication technology as described by Qu et al., Science, v322, p 238-242, 2008.

Although surfaces patterned with setae are described herein predominantly in connection with hearing aid contact transducers, it will be apparent to those skilled in the art that setae may be used at other interfaces between biocompatible materials and living tissues such as the interface between a contact (optical) lens and a cornea. In fact, engineered surfaces displaying variations of setae or other surface micro- and nano-structures are applicable to many situations requiring "weak but sufficient" adhesion. These surfaces provide a platform for a variety of payloads, including, but not limited to, hearing aid transducers. Although we have primarily described EarLenses in contact with the ear drum, they may also be designed to contact parts of the ear canal in addition to, or instead of, the tympanic membrane.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A hearing aid transducer comprising:
    a biocompatible carrier having a surface shaped to fit a tympanic membrane or ear canal; and,
    a driving element attached to the carrier;
        wherein,
            the surface supports a plurality of microscopic setae that are angled with respect to the surface in a pattern that corresponds to a migration pattern of the tympanic membrane.

2. The transducer of claim 1 wherein the density of setae is greater than 100 per square millimeter.

3. The transducer of claim 1 wherein the setae have a length between 10 and 200 microns.

4. The transducer of claim 1 wherein the setae have an aspect ratio greater than 10.

5. The transducer of claim 1 wherein the setae have a Young's modulus between about 0.01 GPa and 10 GPa.

6. The transducer of claim 1 wherein the biocompatible carrier is made of silicone, fluoro-silicone, rubber, or other flexible materials.

7. The transducer of claim 1 wherein the driving element receives electrical power from a photovoltaic cell.

8. The transducer of claim 1 wherein the driving element comprises a coil and a permanent magnet.

9. The transducer of claim 1 wherein the driving element comprises a piezoelectric bimorph.

10. The transducer of claim 1 wherein tips of the setae have a spherical shape.

11. The transducer of claim 1 wherein tips of the setae have a flat shape.

12. The transducer of claim 1 wherein tips of the setae have a cupped shape.

13. The transducer of claim 1 wherein tips of the setae have a foot shape.

14. The transducer of claim 1 wherein tips of the setae have a filament shape.

15. The transducer of claim 1 wherein the setae are equipped with a plurality of spatulas.

16. A method for forming an interface between a living tissue and a biocompatible surface comprising:

providing a biocompatible surface;

forming a plurality of setae on the surface;

orienting the setae according to a migration pattern of tissue upon which the biocompatible surface is to be placed.

17. The method of claim 16 wherein the surface is a surface of a hearing aid transducer and the tissue is the epithelium of a tympanic membrane.

18. The method of claim 16 wherein the forming is accomplished by making the surface and the setae from liquid elastomer using a mold.

19. The method of claim 16 wherein the setae are equipped with a plurality of spatulas.

20. The method of claim 19 wherein the spatula are fabricated using carbon nanotube fabrication technology.

* * * * *